(12) United States Patent
Ishimoto

(10) Patent No.: US 8,166,149 B2
(45) Date of Patent: Apr. 24, 2012

(54) INFORMATION-PROCESSING APPARATUS AND PROGRAM THEREOF

(75) Inventor: Kan Ishimoto, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 493 days.

(21) Appl. No.: 12/342,705

(22) Filed: Dec. 23, 2008

(65) Prior Publication Data

US 2009/0172143 A1    Jul. 2, 2009

(30) Foreign Application Priority Data

Dec. 28, 2007    (JP) .................................. 2007-339338

(51) Int. Cl.
   *G06F 15/173*    (2006.01)
(52) U.S. Cl. .......................... 709/223; 709/220; 709/245
(58) Field of Classification Search .................. 709/250, 709/223, 220, 245; 358/1.15; 370/401; 702/188
   See application file for complete search history.

(56) References Cited

U.S. PATENT DOCUMENTS

| | | | | |
|---|---|---|---|---|
| 2003/0177220 A1* | 9/2003 | Ohara | ........................... | 709/223 |
| 2004/0019671 A1* | 1/2004 | Metz | .............. | 709/223 |
| 2004/0220779 A1* | 11/2004 | Fukao | ........................... | 702/188 |
| 2005/0168771 A1* | 8/2005 | Hatano et al. | ................ | 358/1.15 |
| 2005/0200883 A1* | 9/2005 | Mannion | ...................... | 358/1.15 |
| 2005/0216602 A1* | 9/2005 | Armstrong et al. | ........... | 709/223 |
| 2006/0242272 A1* | 10/2006 | Furukawa | ..................... | 709/220 |
| 2007/0019657 A1* | 1/2007 | Takayama | ..................... | 370/401 |
| 2007/0217408 A1 | 9/2007 | Sahashi et al. | | |
| 2008/0158597 A1* | 7/2008 | Hashimoto et al. | .......... | 358/1.15 |
| 2009/0019141 A1* | 1/2009 | Bush et al. | .................... | 709/223 |

FOREIGN PATENT DOCUMENTS

| | | |
|---|---|---|
| EP | 1 271 895 | 1/2003 |
| EP | 1 465 052 | 10/2004 |
| EP | 1 519 521 | 3/2005 |
| JP | 2001-154967 | 6/2001 |
| JP | 2001-326656 | 11/2001 |

(Continued)

OTHER PUBLICATIONS

European Search Report received for corresponding EP application 08254146.7, mailed Sep. 29, 2009.

(Continued)

*Primary Examiner* — Jungwon Chang
(74) *Attorney, Agent, or Firm* — Banner & Witcoff, Ltd.

(57) ABSTRACT

An information-processing apparatus which is capable of transmitting device identifiers of devices connected with LANs to terminals without using a broadcast command is provided. A server is connected with a World Area Network. A managing terminal and printers are connected with a LAN. The server receives a device identifier of the printer connected with any one of the LANs. The server receives an inquiry for a device identifier from a terminal connected with any one of the LANs. The server stores appended information, which is appended to the device identifier while the device identifier is transferred to the server, in a manner that the appended information is associated with the device identifier. The server transmits to the terminal the device identifier whose appended information as stored in a storage coincides with the appended information that is appended to the inquiry while the inquiry is transferred to the server. The managing terminal can obtain the device identifier of the printer connected with the same LAN as the managing terminal itself by transmitting the inquiry to the server.

6 Claims, 9 Drawing Sheets

FOREIGN PATENT DOCUMENTS

| | | |
|---|---|---|
| JP | 2002-237830 | 8/2002 |
| JP | 2005-223551 A | 8/2005 |
| JP | 2007-049411 | 2/2007 |
| JP | 2007-142903 A | 6/2007 |
| WO | 2005/079023 A1 | 8/2008 |

OTHER PUBLICATIONS

JP Office Action dtd Jun. 28, 2011, JP Appln. 2007-339338, English translation.

* cited by examiner

| IP ADDRESS of Device | Global IP ADDRESS of GW | MAC ADDRESS of Device |
|---|---|---|
| IP-P1 | IP-G1 | MAC-1 |
| IP-P2 | IP-G1 | MAC-2 |
| IP-P3 | IP-G2 | MAC-3 |

FIG. 9

| Global IP ADDRESS of GW | Domain Name | Domain Registrant Information |
|---|---|---|
| IP-G1 | DOMAIN 1 | Company A |
| IP-G2 | DOMAIN 2 | Company B |
| IP-G3 | DOMAIN 1 | Company A |

FIG. 11

| IP ADDRESS of Device | Global IP ADDRESS of GW | Domain Registrant Information | MAC ADDRESS of Device |
|---|---|---|---|
| IP-P1 | IP-G1 | Company A | MAC-1 |
| IP-P2 | IP-G3 | Company A | MAC-2 |
| IP-P3 | IP-G2 | Company B | MAC-3 |

INFORMATION-PROCESSING APPARATUS AND PROGRAM THEREOF

CROSS-REFERENCE TO RELATED APPLICATION

This application claims priority to Japanese Patent Application No. 2007-339338, filed on Dec. 28, 2007, the contents of which are hereby incorporated by reference into the present specification.

BACKGROUND OF THE INVENTION

1. Field of the Invention

The present invention relates to an information-processing apparatus and program thereof suitable for constructing a network environment for managing a device connected with any one of mutually connected networks with a terminal connected with the same network as the device.

2. Description of the Related Art

A technique for managing a device connected with a local area network by utilizing a terminal connected with the same local area network as that of the device is known. "Device" in the present specification represents a device connected with a network, such as a printer, a facsimile, and a copy machine. In the present specification, there may be a case where a terminal for managing a device is simply called a "terminal". Similarly, there may be a case where a local area network is simply called a "network" or "LAN". The terminal is required to obtain a device identifier for identifying the device connected with the same network prior to starting the management of the device. An IP address according to the TCP/IP is a typical example of the device identifiers.

It is a great disturbance for the user to manually input the device identifier into the terminal every time a new device is connected with the network. Conventionally, the terminal has obtained the device identifier of a device newly-connected to the network by utilizing a communication command called a broadcast. Japanese Patent Application Publication No. 2001-154967 discloses such a terminal.

BRIEF SUMMARY OF THE INVENTION

However, there may be a case where the broadcast command cannot be used to obtain the device identifier. For example, as to security-enhanced networks and networks mutually connected via a rooter or a gateway, the device identifier of devices can not always be obtained by the broadcast command. Accordingly, a technique that allows the terminal to obtain device identifier of devices connected with the network, without using the broadcast command is desired.

Teachings disclosed in the present specification solve the above-described problem by providing an information-processing apparatus which receives a device identifier from a device, and also receives an identifier-inquiry from a terminal. The information-processing apparatus transmits, after having received the identifier-inquiry, the device identifier to the terminal in reply thereof. Here, the identifier-inquiry is a command that requests the information-processing apparatus to send a device identifier.

The information-processing apparatus disclosed in the present specification is connected with any one of the mutually connected local area networks. The information-processing apparatus receives a device identifier from each of the devices and stores the device identifier(s). It is sufficient as long as each of the devices is connected with any one of the mutually connected local area networks. For example, the information-processing apparatus may be connected with a network which is different from the network with which the device is connected, so long as those networks are mutually connected. Such networks may be connected with via a rooter or a gateway. The term "a rooter and a gateway" may hereinafter be collectively called as "a gateway".

When the information-processing apparatus receives an identifier-inquiry from a terminal connected with one of the mutually connected local area networks, the information-processing apparatus transmits to the terminal the device identifier of device(s) connected with the network with which the terminal is connected. The information-processing apparatus specifies the device identifier of the device(s) connected with the same network as with the terminal, based on the appended-information that is appended to the device identifier and the identifier-inquiry while they are respectively transferred to the information-processing apparatus. Description of the appended information will be given later. The information-processing apparatus may collect multiple different device identifiers and delivers the suitable device identifier(s) to the terminal which has transmitted the identifier-inquiry. In other words, the information-processing apparatus may function as a so-called server. Hereinafter, there may be a case where the information-processing apparatus having technical features disclosed in the present specification is called a "server".

A configuration of the server will be described. The server is provided with a receiver, a storage, and a transmitter. Essential functions of the receiver and the transmitter may be realized by a program and a CPU. The receiver receives a device identifier from a device connected with any one of the networks. The receiver also receives an identifier-inquiry from a terminal connected with any one of the networks. In the course of transmission, appended information is appended to the device identifier and the identifier-inquiry respectively by the gateway while the device identifier and the identifier-inquiry is transferred through the network. To distinguish the aforesaid plurality of appended information, the information appended to the device identifier is called device-appended information, whereas the information appended to the identifier-inquiry is called terminal-appended information. It is sufficient, but not limited thereto, the appended information is typically a gateway IP address which is appended when the device identifier or the identifier-inquiry passes the gateway.

The server stores the received device identifier together with the device-appended information in the storage. The server may store multiple different device identifiers. The device identifier to which the device-appended information had been appended is associated with its device-appended information.

In a case where one of the stored device-appended information coincides with the terminal-appended information which is appended to the received identifier-inquiry, the transmitter transmits to the terminal (the sender of the identifier-inquiry) the device identifier associated with the device-appended information which had made the match. Typically, the transmitter may extract, from among the stored device identifiers, the device identifier which has the same address as the gateway IP address appended to the identifier-inquiry, and then transmits the extracted device identifier to the terminal. In the above circumstances, a plurality of device identifiers may be extracted and transmitted. In other words, the server transmits to the terminal the device identifier(s) which had passed the same gateway as the identifier-inquiry. The fact that the identifier-inquiry and the device identifier(s) have passed the same gateway indicates that the terminal and the device(s) are connected within the same network. The server of the present teachings enables the terminal to obtain device identifier of the device (may there be one or more) connected with the same network as the terminal itself without using the broadcast command.

Description of the gateway will be given. Two networks are connected via a special equipment called a gateway. In a case where a device connected with one network transmits data to another device or a terminal which is connected with the other network, the gateway relays (or transfers) the data. Here, the one network may be called, but not limited thereto, "the LAN (the local area network" and the other network may be called "the global network". In the course of data relay, the gateway adds an IP address, which is utilized in communication through the global network, to the data. An IP which is utilized in communication through the global network may be called a "global IP address". The global IP address is assigned to a communication port of the gateway, whereas the communication port is connected to the global network. There may be a case where a global IP address of the gateway is called a "gateway IP address".

Similarly, a gateway address assigned to a communication port on the outside of a gateway, which connects the network with which the terminal is connected and an outside network (global network), is appended to the identifier-inquiry transmitted by the terminal.

These gateway IP addresses are unlimited examples of the appended information described above. More specifically but unlimitingly, with reference to the gateway IP address which is respectively appended to the device identifier and the identifier-inquiry, the server specifies the device identifier(s) of the device(s) connected with the same network as the terminal. The server transmits the specified device identifier(s) to the terminal.

Teachings disclosed in the present specification may establish a network system which includes the above-described server, the device for transmitting a device identifier to the server, and the terminal for transmitting an identifier-inquiry to the server.

Teachings also disclosed in the present specification realize a method for searching the device which is to be managed by the terminal in unanimous cooperation of the server (information-processing apparatus), the device, and the terminal. The device which is desired to be managed by the terminal is called a "target device". This method includes the following steps:

(1) a first transmitting step which transmits, to the server that is connected with the network that is connected via a gateway with a network to which the target device is connected, a device identifier that is required for communication with the device; this step may be executed by the device itself, or by other devices in charge of the aforesaid device.

(2) a storing step executed by the server for storing the received device identifier in the storage in a manner that the device identifier is associated with a gateway identifier that had been appended to the received device identifier while passing the gateway;

(3) a requesting step which transmits a command (identifier-inquiry) that requests the server to transmit the device identifier of the target device to the server connected with the network via the gateway; this step is executed by the terminal which manages the device.

(4) a read-out step executed by the server for reading out from the storage the device identifier which coincides with the gateway-identifier appended to the identifier-inquiry received from the terminal; and (5) a second transmitting step for transmitting the read-out device identifier to the terminal.

Through execution of the above-described steps, the terminal which manages the device can obtain the device identifier of the target device.

BRIEF DESCRIPTION OF THE DRAWINGS

FIG. 9 shows contents of a domain database stored by a WHOIS server.

FIG. 11 shows contents of a device database stored by the server of the second embodiment.

DETAILED DESCRIPTION OF THE INVENTION (First Embodiment) An information-processing apparatus according to the first embodiment will be described with reference to the drawings. The information-processing apparatus according to this embodiment is a server 10. FIG. 1 is a block diagram showing a network system 100 including the server 10. The network system 100 is a system in which the server 10, a device managing terminal 34, a first printer 32a, and a second printer 32b are connected. The server 10 is connected with a World Area Network 92. The device managing terminal 34, the first printer 32a, and the second printer 32b are connected with a local area network 90a. A client terminal 36 is also connected with the local area network 90a. The device managing terminal 34 manages devices which are connected with the identical local area network 90a (i.e. the first printer 32a and the second printer 32b). The server 10 provides the device managing terminal 34 with device identifiers of the devices which are connected with the identical local area network 90a. The server 10 enables the device managing terminal 34 to obtain the device identifiers without using a broadcast command.

Figure 1:
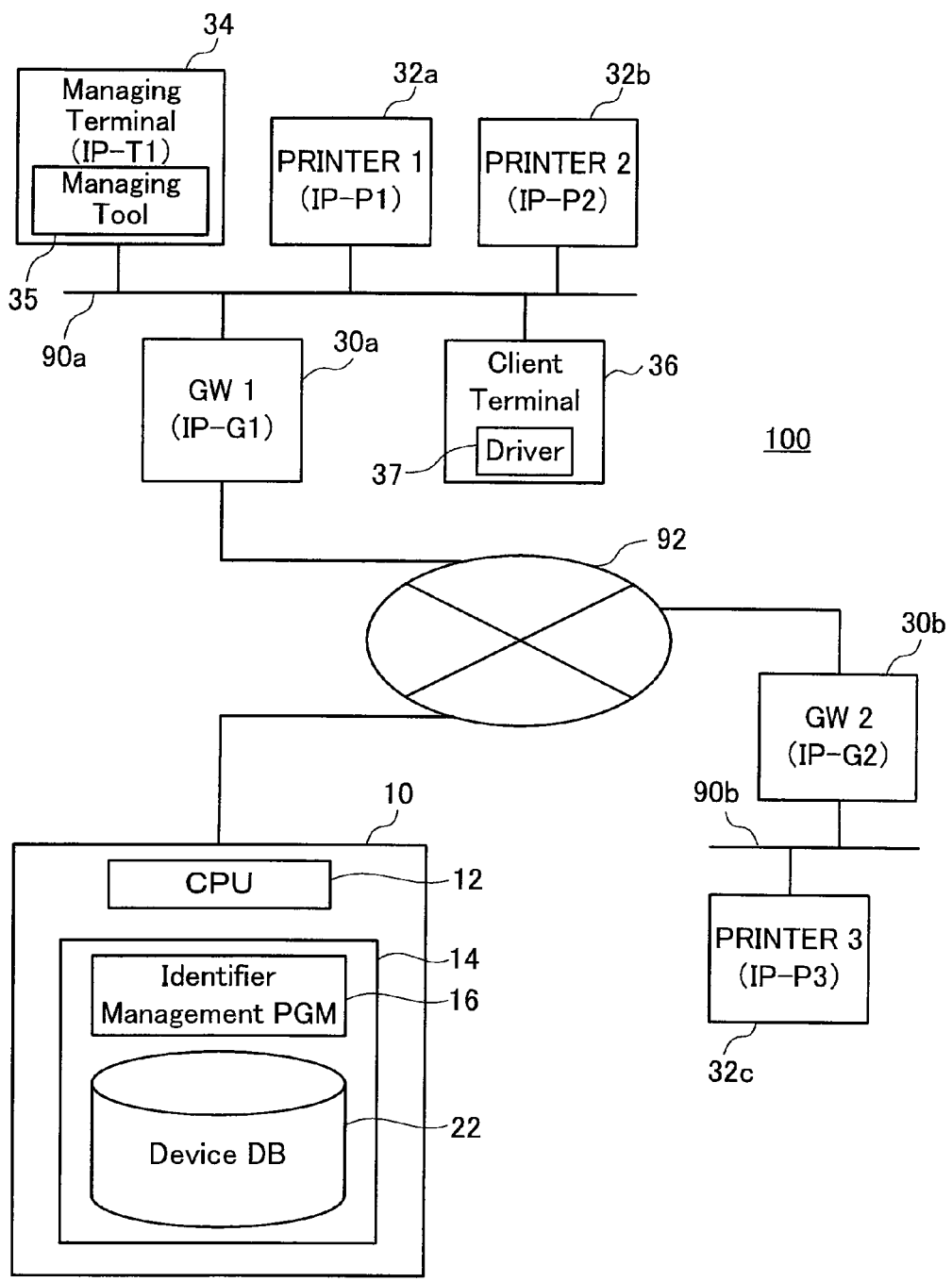
FIG. 1 is a schematic block diagram showing the entire system of a first embodiment.

In the present specification, the fact that "device managing terminal 34 is connected with the local area network 90a" may be described as "device managing terminal 34 belongs to the local area network 90a." In other words, it may also be described as "the device managing terminal 34, the first printer 32a, the second printer 32b, and the client terminal 36 belong to the same local area network 90a".

Hereinafter, the local area network 90a is simply called a "LAN 90a", and the World Area Network 92 is simply called a "WAN 92". Further, as shown in FIG. 1, the first printer 32a and the second printer 32b may be called a "printer 1" and a "printer 2", respectively. Further, the device managing terminal 34 is simply called a "managing terminal 34".

In this embodiment, the WAN 92 represents a plurality of networks other than the LAN 90a, that is, networks in which LAN 90b and other plurality of LANs not shown in the drawings are mutually connected. The LAN 90a is connected with the WAN 92 via a first gateway 30a. The LAN 90b is connected with the WAN 92 via a second gateway 30b. The LAN 90b is a network which is different from the LAN 90a. A third printer 32c is connected with the LAN 90b.

As shown in FIG. 1, the first gateway 30a and the second gateway 30b may be called a "GW 1" and a "GW 2", respectively. The third printer 32c may be called a "printer 3". Hereinafter, a group of multiple printers may be generically called "printers," in a single term.

A reference symbol "IP-T1" represents an IP address of the managing terminal 34. Reference symbols "IP-P1," "IP-P2," and "IP-P3" represent IP addresses of the printer 1, the printer 2, and the printer 3, respectively. Reference symbols "IP-G1" and "IP-G2" represent global IP addresses (i.e. IP addresses assigned to a communication port of a gateway that is connected with the WAN 92 through the communication port) of the GW 1 and the GW 2, respectively. Local IP addresses (i.e. IP addresses assigned to the other communication port of the gateway that is connected with the LAN through the other communication port) are also assigned to the GW 1 and the GW 2, respectively, but the local IP addresses are omitted from the drawings. The IP addresses are expressed in 32-bit symbol or 128-bit symbol divided by 8 bits each, but in the present specification the IP addresses are expressed in a simplified symbol, such as "IP-T1" for the sake of simplicity.

The printer 1, the printer 2, and the printer 3 are typical examples of the "device." The "IP address" is a typical example of the device identifiers which identify the device or the terminal on the network. It is sufficient as long as the device identifier is unique within the LAN to which the device identifier itself belongs; there may be a case where the same device identifier is assigned to another device (or another terminal) which belongs to another LAN.

The devices (printer 1 and the like), the managing terminal 34, the client terminal 36, and the server 10 can communicate with each other. In the case of communication between mutually connected LANs, the gateway (e.g. GW 1) which connects the LANs relays data. In the course of relay, the gateway appends the global IP address of itself to the data received via one LAN, and then transmits the data to the other LAN.

The managing terminal 34 and the client terminal 36 may be, for example, personal computers. The managing terminal 34 is a terminal for managing devices (the printer 1 and the printer 2) which belong to the same LAN 90a as the managing terminal 34 itself. A managing tool 35 (management program) for managing the devices is installed in the managing terminal 34.

The client terminal 36 is a terminal that installs a device driver program for a device such as the printer 1. Installation of the device driver enables the client terminal 36 to use the printer 1 and the like.

A configuration of the server 10 will be described. The server 10 is provided with a CPU 12 and a storage 14. An identifier management program 16 (program for the information-processing apparatus) and a device database 22 are stored in the storage 14. Note that the character "PGM" shown in FIG. 1 stands for "program." The character "DB" stands for "database." Hereinafter, there is a case where a "device database 22" is simply expressed as "device DB 22."

In the network system 100, the managing terminal 34 requires to communicate with each of the devices in order to allow the managing terminal 34 to manage the devices (printer 1 and the like) which belong to the same LAN 90a as the managing terminal 34 itself. Therefore, the managing terminal 34 has to obtain an IP address of each device. However, it is burdensome to input an IP address of the device into the managing terminal 34 every time a device is added to the LAN 90a or an IP address of the device has been changed. In the network system 100, an IP address of the device is registered in the server 10. By inquiring the server 10 of the IP address of the devices, the managing terminal 34 can obtain the IP addresses of the devices which belong to the same LAN 90a as the managing terminal 34 itself. Likewise, a managing terminal (not shown in the drawings) belongs to the LAN 90b. The server 10 receives an identifier-inquiry, from each managing terminal of each LAN, inquiring of an IP address of the device which belongs to the same LAN as each managing terminal belongs. The server 10 registers (stores) IP addresses of the devices which belong to one of the LANs. The server 10, upon receiving the identifier-inquiry of an IP address of a device as sent from the managing terminal, informs the managing terminal, i.e. the inquirer, of the IP addresses of the devices which belong to the same LAN as the managing terminal. The server 10 according to this embodiment can specify the LAN to which each of the devices belongs, and also can specify the LAN to which the managing terminal, the sender of the identifier-inquiry, belongs. That is to say, the server 10 can specify a LAN of each of the devices and a LAN of the managing terminal, and also can inform the managing terminal, which has transmitted the identifier-inquiry, of the IP addresses of the devices which belong to the same LAN as the managing terminal. Hereinafter, the term "identifier-inquiry" may be called "inquiry" for short.

Hereinafter, described is a case where IP addresses of the devices (printer 1 and the like) which belong to the LAN 90a are registered in the server 10 and the managing terminal 34 which belongs to the LAN 90a obtains from the server 10 the IP addresses of the devices (printer 1 and the like) which belong to the same LAN 90a as that of the managing terminal 34 itself.

Figure 2:
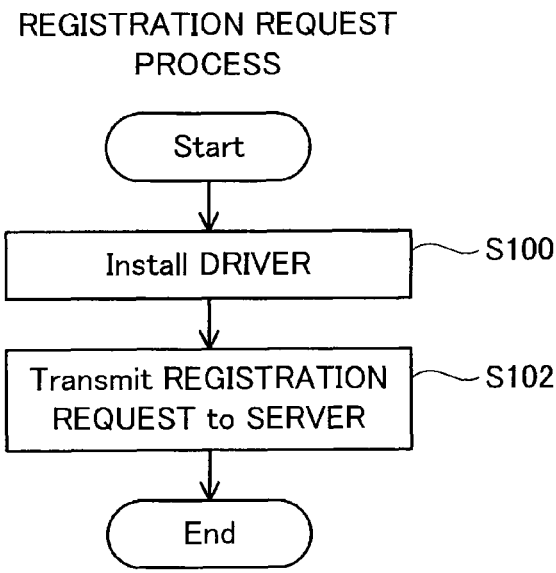
FIG. 2 is a flowchart of a registration requesting process to be carried out by client's terminal.

First of all, a process of registering an IP address of the printer 1, which is one of the devices, in the server 10 will be described. A similar process is carried out also in the case of registering other devices, e.g. the printer 2. The process of transmitting an IP address of the printer 1 to the server 10 is carried out by the client terminal 36. The client terminal 36, when a device driver of the printer 1 is installed, transmits a registration request (command) that requests the server 10 to register the IP address of the printer 1. FIG. 2 is a flowchart of a process of requesting the registration of the IP address to be carried out by the client terminal 36.

In order to control the printer 1 to carry out a printing process, the printer driver of the printer 1 must be previously installed in the client terminal 36 by utilizing a CD-ROM and the like. The processes carried out at the time of installing driver 37 for the printer 1 will be described below. The client terminal 36 installs the driver 37 of the printer 1 (Step 100). The process of installing the driver 37 may be carried out by a widely known technique. Then, subsequently to the installing process of the driver 37, the client terminal 36 transmits the registration request (which is a command that requests the server 10 to register the IP address of the printer 1) to the server 10 (Step 102). For example, the registration request transmission process at Step 102 is incorporated in an installation wizard that is utilized in installing the printer driver. The client terminal 36 simultaneously transmits to the management server 10, the IP address of the printer 1 whose driver is being installed, as well as a node name and a MAC address (Media Access Control Address) of the printer 1. Values of the MAC address and the like which are set at the time of installing the driver are utilized. There may be a case where information including the IP address, the node name, and the MAC address of the printer 1 is generically called "register information." In Step 102, the register information set at the client terminal 36 at the time of installing the driver 37 at Step 100 is used. Communication information (for example, the IP address of the server 10, URL for accessing the server 10 and the like) is stored in the driver 37 in advance. The client terminal 36 may transmit the register information to the server 10 based on the stored communication information. When transmission of the register information is completed, the client terminal 36 terminates the registration request process.

There may be a case where the IP address of the printer 1 is changed. Such change in the IP address occurs, for example, in a case where the IP address is automatically set by a DHCP server and the like at the time of activation of the printer 1, or in a case where the IP address is intentionally changed by user's operation of an operation panel of the printer 1 and the like. Since the managing terminal 34 has to communicate with the printer 1 in order to manage the printer 1, the managing terminal 34 thereby must to know of the IP address of the printer 1 after it has been changed. Therefore, it is necessary to register the updated IP address of the printer 1 in the server 10. In other words, in a case where the IP address of the printer 1 is changed, it is necessary for the printer 1 to request the server 10 to update its registered IP address.

Figure 3:
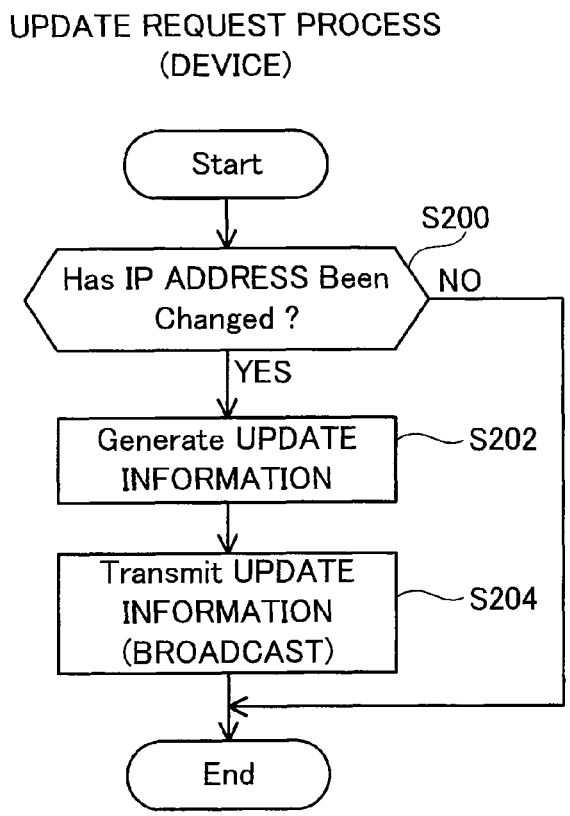
FIG. 3 is a flowchart of an update requesting process to be carried out by a device.

The process (update request process) of requesting the server 10 to update the IP address of the device registered in the device DB 22 when the IP address of the printer 1 is changed will be described. The update request process is realized in collaboration of the printer 1 and the client terminal 36. FIG. 3 is a flowchart of the update request process to be carried out by the printer 1 when an IP address of the printer 1 itself has been changed. This process is carried out every time the printer 1 is activated. The printer 1 monitors whether or not its IP address has been changed (Step 200). Specifically, the printer 1 determines whether or not the already-stored IP address coincides with the IP address set after the activation. Also in a case where instructions from an external device (for example, the client terminal 36) to change the IP address stored in the storage are received, the process shown in FIG. 3 is started. Also in this case, an affirmative judgment is made at Step 200. When its own IP address has been changed (YES at Step 200), the printer 1 generates update information (Step 202). The update information includes the IP address before the change (which is stored in the storage), the newly-set IP address after the change, its node name and MAC address. The generated update information is transmitted to the LAN 90a by broadcasting (Step 204).

Figure 4:
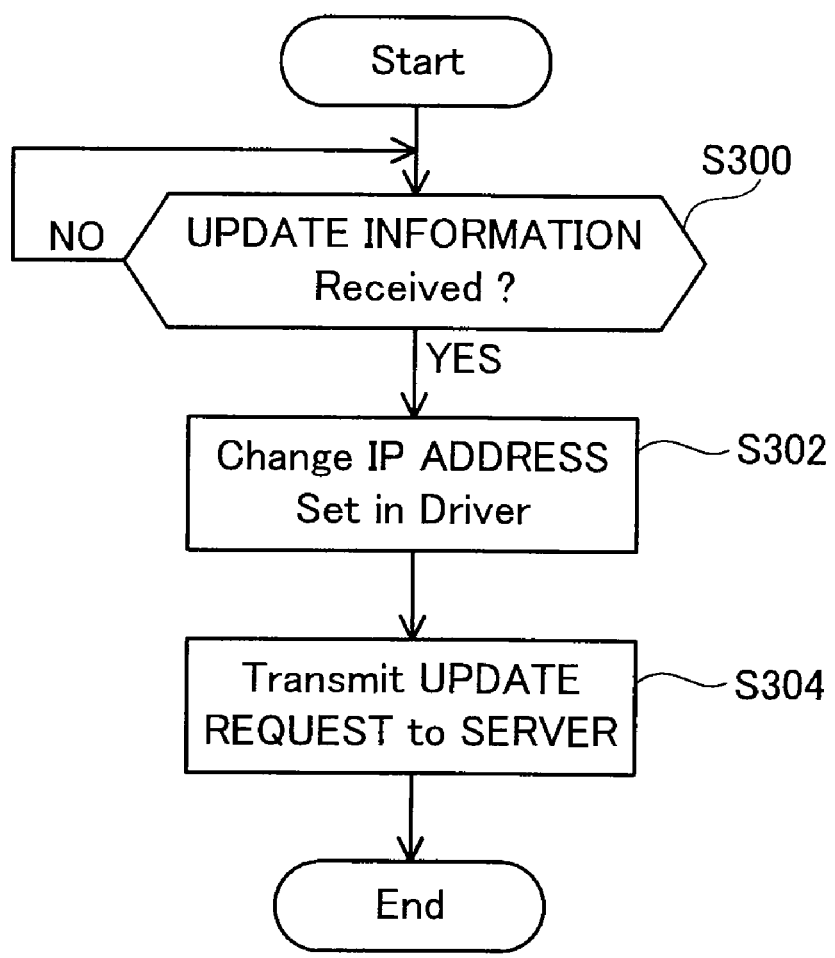
FIG. 4 is a flowchart of an update requesting process to be carried out by client's terminal.

Next, description of the process to be carried out by the client terminal 36 will be described. The process (update request process in the client terminal 36) shown in FIG. 4 is an example of the "program for device." After the completion of installation of the driver 37, the client terminal 36 waits for the update information to be transmitted from the printer 1 (Step 300). Judgment process at Step 300 is carried out when the printer 1 receives the broadcasted update information on the LAN 90a at Step 204 (refer to FIG. 3). In the process at Step 300, specifically, the client terminal 36 compares the IP address before the change, which is included in the received update information, with the IP address (IP address of the printer 1 at the time of installation of the driver) which is used when the client terminal 36 had installed the driver 37 at the printer 1. When the both addresses coincide with each other, it is determined that the update information received at Step 300 is the update information of the printer 1 (YES at Step 300).

In a case where the update information received at Step 300 is the update information of the printer 1, the client terminal 36 updates the IP address of the printer 1 which had been set at the installed driver 37 to the IP address after the change (Step 302). Then, the client terminal 36 transmits to the server 10 the update information received at Step 300 together with an update request (command) (Step 304).

May it be a formerly-set IP address or a newly-set IP address, the server 10 obtains the IP address (device identifier) of the printer 1 by receiving the registration request or the update request described above. Hereinafter, there may be a case where a "registration request," an "update request" and an "inquiry", which is described later, are generically called a "command." The "register request," the "update request" and the "inquiry" are transmitted in a manner that they are divided into a predetermined data length and are transmitted in such units. Each of the data divided may be called a "packet." There may be a case where data of a size smaller than the predetermined data length is transmitted in a single packet.

Figure 5:
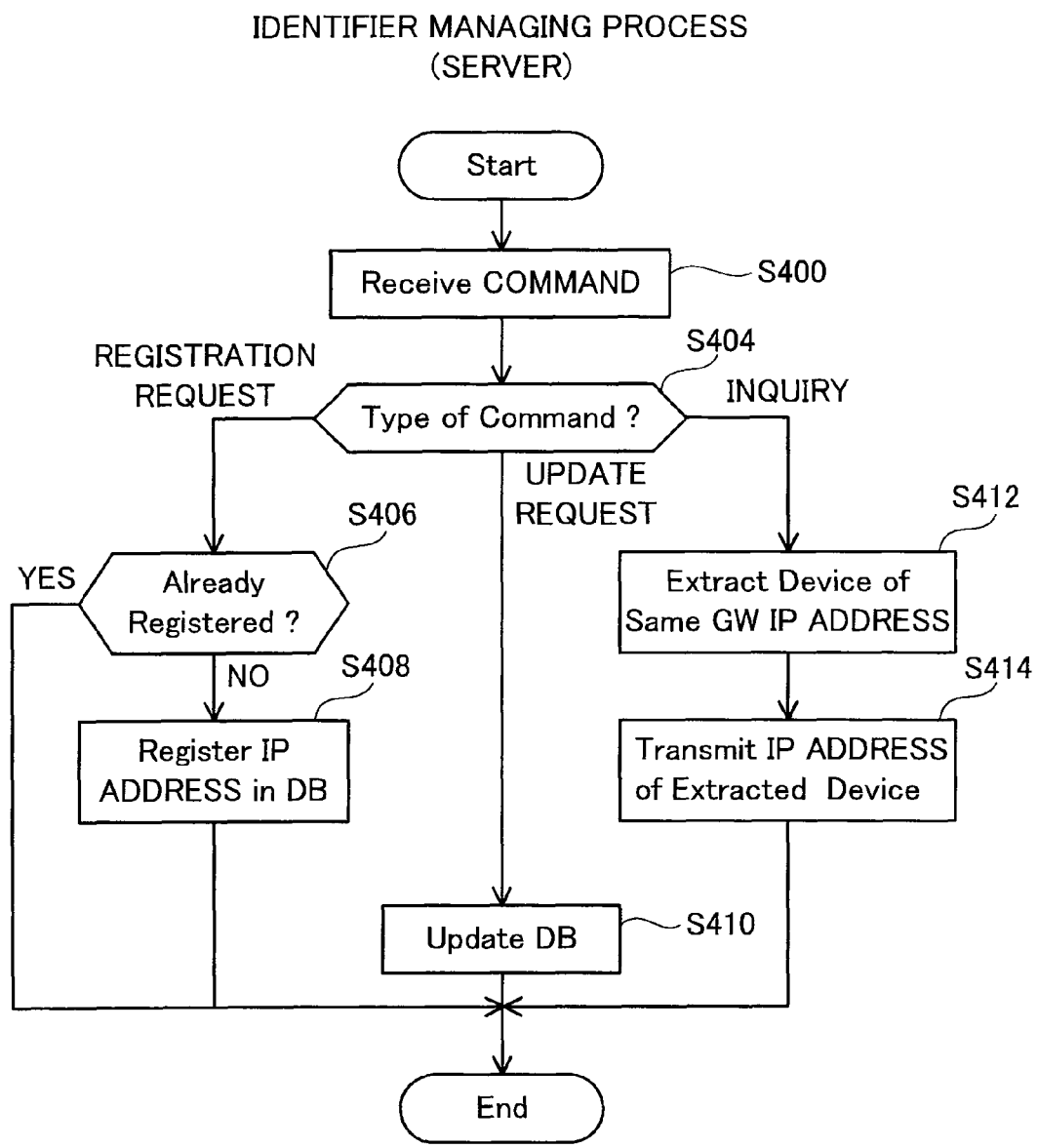
FIG. 5 is a flowchart of a process to be carried out by a server.

Next, the process of the server 10 will be described. FIG. 5 is a flowchart of the process to be carried out by the server 10. The process shown in FIG. 5 may be called the device identifier managing process. The server 10 is on standby for receiving a command from an external device (the device or the managing terminal) at the time of activation. The server 10, upon receiving a command from the external device (Step 400), determines which of the "registration request," the "update request," and the "inquiry" command has been received (Step 404). Based on the judgment made at Step 404, respective process corresponding to the type of the command is carried out as described later.

Note that, the registration request or the update request transmitted by the client terminal 36 is transmitted in a state of being divided into packets. Similarly, the inquiry to be transmitted by the managing terminal 34 is also divided into packets. The packets transmitted by the client terminal 36 or the managing terminal 34 are relayed by the gateway 30a. At the time of relay, the global IP address of the gateway 30a is appended to each of the packets. Specifically, the global IP of the gateway 30a is appended to each of the packet, whereas the global IP of the gateway 30a is transferred by the gateway 30a as an IP address of the sender of the packets. The global IP of the gateway 30a appended at the time of relaying the packets is an example of "appended information" that is to be appended to the "command." The global IP of the gateway 30a appended to each of the packets functions as the appended information for specifying the LAN (LAN 90a) to which the client terminal 36 belongs. The "registration request" and the "update request" received by the server 10 from the client terminal 36 are for informing the server 10 of the IP address of the printer 1. Therefore, the global IP address of the gateway 30a that is included in the packets of the "registration request" or the "update request" can be expressed as the appended information for specifying the LAN to which the printer 1 belongs. In the other hand, the server 10, based on the appended information (e.g. global IP address of the gateway 30a) appended while an "inquiry" transmitted by the managing terminal 34 is transferred to the server 10, can likewise specify the LAN to which the managing terminal 34 belongs. The appended information to be additionally attached to a command transmitted by the printer 1 is called device-appended information, and the appended information to be additionally attached to a command transmitted by the client terminal 36 is called terminal-appended information.

Getting back to FIG. 5, the description will be continued. In a case where the command received is a "registration request", the program moves to the process at Step 406. At Step 406, the server 10 determines whether or not an IP address of the device included in the registration request has already been registered in the device DB 22. Specifically, as described above, the IP address of the device as well as the node name and the MAC address are included in the registration request. As described above, the IP address, the node name, and the MAC address of the device are generically called "register information." At Step 406, the server 10 determines whether or not the register information included in the registration request received at Step 400 is the same as the register information already registered in the device DB 22. For example, there may be a case in which multiple client terminals install the same printer driver, whereas the server 10 receives the registration requests relating to the identical register information for the same device which has already been registered. In this case (YES at Step 406), the process is terminated since no more registration related to the device at issue is required. In a case where the register information included in the received registration request has not been registered yet (NO at Step 406), the server 10 registers the received register information in the device DB 22 (Step 408). Specifically, the server 10 reads out the IP address and the MAC address of the device and the IP address of the sender of the packets from the received register information. As described above, since the packets are transmitted to the server 10 through the gateway 30a, the IP address of the gateway 30a is designated to the IP address of the sender of the packets. At Step 408, the server 10 registers in the device DB 22 the IP address and the MAC address of the device that have been read out in a manner that the IP address and the MAC address of the device are associated with the IP address of the sender of the packets. The IP address of the sender corresponds to the global IP address of the gateway 30a. In other words, the server 10 stores the IP address of the device in a manner that the IP address of the device is associated with the device-appended information (the global IP address of the gateway 30a) specifying the LAN to which the device belongs. In the present specification, "to store" is synonymous with "to register."

Figures 6, 7:
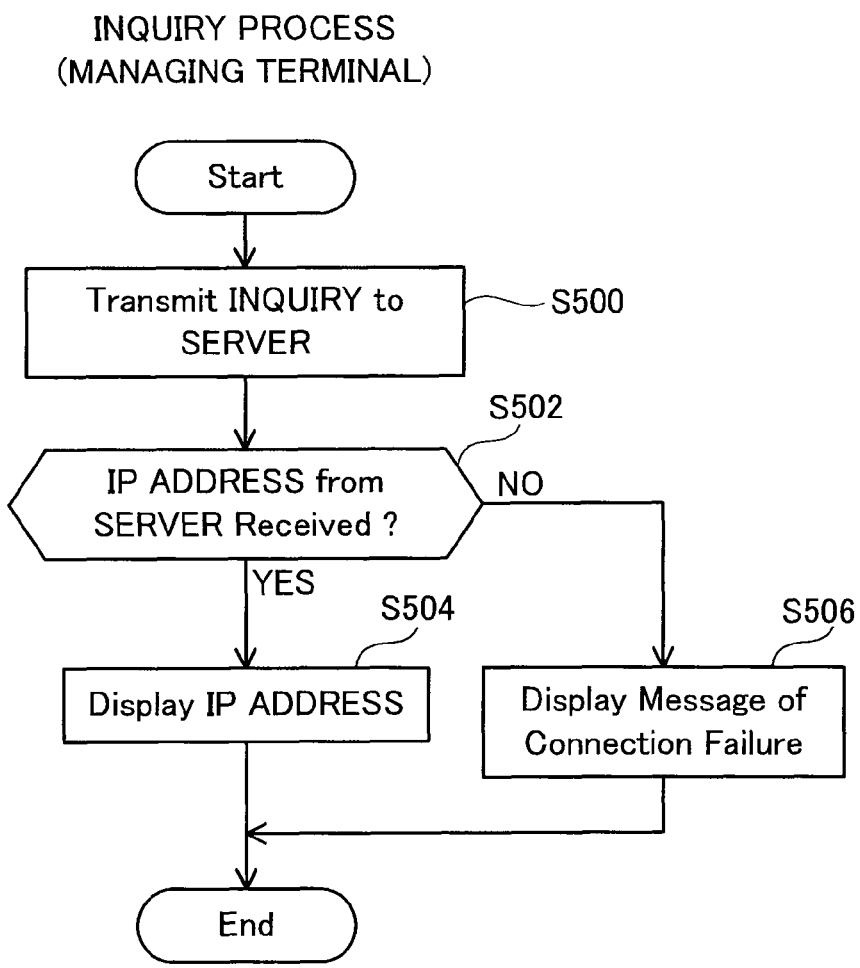
FIG. 6 shows contents of a device database stored by a server.
FIG. 7 is a flowchart of an inquiry process to be carried out by a managing terminal.

FIG. 6 shows a concrete example of the device DB 22. In FIG. 6, a single row of the table represents a single record (a group of items associated with each other). The server 10 additionally registers the IP address and the MAC address of the device and the device-appended information specifying the LAN to which the device belongs in the device DB 22 as a new single record. In other words, the server 10 stores the device identifier (device IP address) attached to the registration request in a manner that the device identifier is associated with the appended-information specifying the LAN to which the device belongs.

As shown in FIG. 1, the IP addresses "IP-P1" and "IP-P2" are assigned to the printer 1 and the printer 2, respectively. The LAN 90a to which the printer 1 and the printer 2 belong is connected with the WAN 92 through the GW 1. When the client terminal 36 transmits a registration request of the printer 1 to the server 10, the registration request is relayed by the GW 1. The global IP address "IP-G1" is assigned to the GW 1. The global IP address of the GW 1 is appended to the registration request, which is received by the server 10, as the IP address of the sender of the packets. A shown in FIG. 6, the server 10 stores the IP address "IP-P1" of the printer 1 in a manner that the IP address "IP-P1" is associated with the MAC address "MAC-1" of the printer 1 and the global IP address "IP-G1" of the GW 1. Similarly, when the client terminal 36 transmits a register command of the printer 2, the server 10 stores the IP address "IP-P2" of the printer 2 in a manner that the IP address "IP-P2" is associated with the MAC address "MAC-2" of the printer 2 and the global IP address "IP-G1" of the GW 1.

On the other hand, the IP address named "IP-P3" is assigned to the printer 3 which is connected with the LAN 90b. A registration request of the printer 3 is transmitted to the server 10 by another client terminal (not shown in the drawings) which is connected with the LAN 90b. The packets of the registration request of the printer 3 are relayed by the GW 2. The global IP address "IP-G2" is assigned to the GW 2. The server 10, upon receiving the registration request of the printer 3, as shown in FIG. 6, stores the IP address "IP-P3" of the printer 3 in a manner that the IP address "IP-P3" is associated with the MAC address "MAC-3" of the printer 3 and the global IP address "IP-G2" of the GW 2.

In a case where the command received at Step 400 is an update request, the process at Step 410 is carried out. At Step 410, the server 10 updates, based on the update information (e.g. new IP address of the device) included in the update request, the register information of the device (e.g. old IP address of the device) registered in the device DB 22. The detailed description of the process at Step 410 is as follows.

The server 10 specifies, based on update information included in the received update request, device register information of the device shown by the update information from among the plurality of register information which is registered in the device DB 22. Specifically, a record including the IP address of the device which coincides with the IP address before the change as included in the update information is retrieved from the device DB 22. The retrieved record is updated by utilizing the IP address after the change as included in the update information, the MAC address of the device, and the IP address of the sender of the packets. It is sufficient at this time, to simply change the IP address of the device into the new IP address. Based on the IP address before the change as included in the update information, the record to be updated is specified. Alternatively, the record to be updated may be specified based on the MAC address of the device which is included in the update information.

In a case where the command received at Step 400 is an "inquiry", the program moves to the process at Step 412. At Step 412, the IP address of the sender of the packets which are included in the received inquiry is extracted. As described above, the IP address of the sender of the packets represents the LAN to which the managing terminal, i.e. the sender of the inquiry, belongs. As shown in FIG. 1, the LAN 90a to which the managing terminal 34 belongs is connected with the WAN 92 by the GW 1. In a case where the managing terminal 34 transmits the inquiry to the server 10, the inquiry is relayed by the GW 1. The global IP address "IP-G1" is assigned to the GW 1. The global IP address of the GW 1 is designated to the packets of the inquiry received by the server 10 as the IP address of the sender of the packets. Further at Step 412, a record of the device DB 22 is retrieved by utilizing the global IP address of the GW 1 which is appended to the packets of the inquiry as a retrieval key. Specifically, the server 10 retrieves a record including the global IP address which coincides with the global IP address of the GW 1 appended to the packets of the inquiry. In other words, at Step 412, the server 10 extracts from the device DB 22 a device identifier (IP address of the device) which is associated with the device-appended information which coincides with the terminal-appended information (e.g. identifier of the gateway) appended to the received inquiry. As a result, the IP address of the printer which belongs to the same LAN 90a as the managing terminal 34 is extracted.

Next, the server 10 transmits the extracted IP address of the printer to the managing terminal 34 (Step 414). In other words, the server 10 transmits to the managing terminal 34 the device identifier of the device (printer) which is connected with the same LAN as the managing terminal 34 which transmitted the inquiry (Step 412 and Step 414). Taking FIG. 6 as an example, the device identifiers which coincide with the global address of the GW 1 are "IP-P1" and "IP-P2." Therefore, the server 10 transmits these two device identifiers to the managing terminal 34.

The above-described process (identifier managing process) is written in the identifier management program 16 which is stored by the server 10. In other words, the following processes are written in the identifier management program 16. A device identifier and an inquiry are received (Step 400). Here, device-appended information is appended to the device identifier while the device identifier is transferred to the server 10. Similarly, terminal-appended information is appended to the inquiry while the inquiry is transferred to the server 10. The appended information is a global IP address of the gateway. The device-appended information is stored in a manner that the device-appended information is associated with the device identifier (Step 408). The device identifier associated with the device-appended information which coincides with the terminal-appended information appended to the inquiry is transmitted to the managing terminal (Step 412 and Step 414).

In a case where the command received at Step 400 is not any one of the "registration request", the "update request", or the "inquiry", the server 10 carries out a process (not shown in the drawings) corresponding to the received command.

Next, the process to be carried out by the managing terminal 34 for obtaining, from the server 10, the IP address of the device connected with the same LAN as the managing terminal 34 belongs to will be described. This process is called the inquiry process. FIG. 7 is a flowchart of the inquiry process. This process is started by activating the managing tool 35 stored in the managing terminal 34.

First of all, the managing terminal 34 transmits the packets of "inquiry" to the server 10 (Step 500). Next, the managing terminal 34 waits for a reply to the inquiry, which is transmitted at Step 500, from the server 10 (Step 502). The reply to the inquiry includes an IP address of the device that is connected to the LAN 90a. It should be noted that, in a case where a plurality of devices are connected to the LAN 90a and the IP addresses of the plurality of devices are registered within the server 10, all of the relevant IP addresses may be included in the reply to the inquiry. The managing terminal 34, in a case where no reply is received within a predetermined time period (NO at Step 502), displays a message of failure of connection on a monitor (Step 506). The managing terminal 34, when receiving the reply from the server 10 (YES at Step 502), the managing terminal 34 displays a list of IP addresses of the devices which are received from the server 10 on the monitor as a device list (Step 504). The managing terminal 34 can change the setting of the device or manage the device by user's selection of a specified device from among the displayed device list. Additionally, at Step 502, the managing terminal 34, after receiving the reply from the server 10, may inquire of each device about their status based on the received IP address. In this case, the managing terminal 34 may display the result of the inquiry together with the device list at Step 504.

Through the processes described above, the managing terminal 34 can obtain IP addresses of the printers connected with the same LAN as the managing terminal 34 itself. According to the present embodiment, such collective accumulation of device identifiers (i.e. IP addresses) necessary for managing the devices belonging to the same network can be easily realized without user's input of IP addresses of each and every printer, nor without transmitting a broadcast (command whose destination is not specified). The teachings disclosed in the present embodiment provide a simple, and reliable technique that can be suitably employed in device management in a network environment.

The function described above can be realized by memorizing an IP address of the server 10 at the client terminal 36 and the managing terminal 34. Although it is possible to acknowledge of the IP address of the server 10 in advance (for example, at the time of shipment of the device), the LAN to which the device or the terminal belongs cannot be determined in advance. Even in this case, because of the server 10, the managing terminal 34 can obtain an IP address of the device connected with the same LAN as the managing terminal 34 itself.

Once the above-described server 10 is realized, each managing terminal of multiple LANs can be sufficiently managed simply by a single server (or a small number of servers). The single server can provide each managing terminal with device identifiers of the devices connected with the LAN that each managing terminal belongs to. For example, when a single server is prepared by a supplier of a printer, multiple organizations can easily manage their own respective devices at their respective managing terminal.

Figure 8:
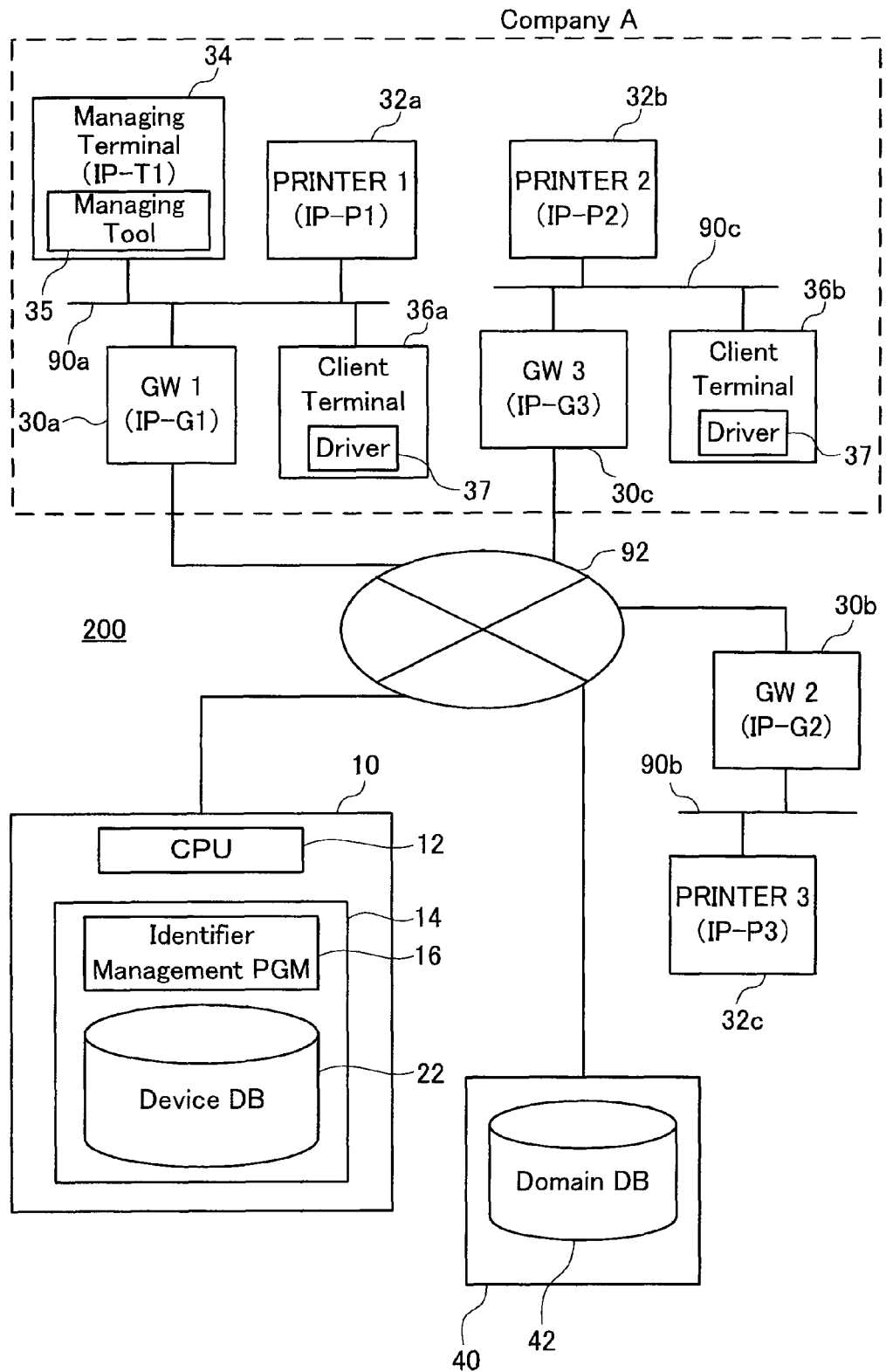
FIG. 8 is a typical block diagram showing a whole system of a second embodiment.

(Second Embodiment) Next, a second embodiment will be described. An information-processing apparatus according to the second embodiment is a server similar to that of the first embodiment. FIG. 8 shows a block diagram of a network system 200 according to the second embodiment. In FIG. 8, the same reference symbol as that of FIG. 1 is attached to the same component as that of the first embodiment. Since the configuration of the server 10 according to the second embodiment is same as the configuration of the server according to the first embodiment, the description thereof will be omitted.

In the second embodiment, the printer 2 (second printer 32b) is connected with another LAN 90c which configures a systematically discrete network from the LAN 90a. The client terminal 36b for installing a driver into the printer 2 is also connected with the LAN 90c. It should be noted that the client terminal 36a for installing a driver into the printer 1 is connected with the LAN 90a.

The printer 1 connected with the LAN 90a and the printer 2 connected with the LAN 90b are managed by the single managing terminal 34. Both of the LAN 90a and the LAN 90b are LANs of Company A. In other words, the LAN 90a and the LAN 90b should be logically considered as a "single LAN."

The LAN 90c is connected with the WAN 92 via a third gateway 30c. As shown in FIG. 8, there may be a case where the third gateway 30c is simply called a "GW 3." A global IP address "IP-G3" is assigned to the GW 3. A local IP address is also assigned to the GW 3, but omitted from the drawings. The local IP address represents an IP address which is assigned to a communication port of a gateway that connects with a LAN through the communication port.

A WHOIS server 40 is connected with the WAN 92. The WHOIS server is a server for searching, on the Internet, a domain name, an IP address, an owner of Autonomous System (AS) number. When receiving an "inquiry" from a terminal according to the TCP/IP, the WHOIS server 40 carries out database searching and makes a reply concerning the result. The WHOIS server 40 is a typical example of "domain-information-managing apparatuses". Hereinafter, the "WHOIS server 40" is simply called a "W-server 40." The W-server 40 stores the domain database 42. There may be a case where the "domain database 42" is simply called a "domain DB 42."

A concrete example of the domain DB 42 is shown in FIG. 9. In the domain DB 42, the global IP address "IP-G1" of the GW 1 is associated with the domain name "DOMAIN1" to which the LAN 90a belongs and domain registrant information "Company A" which manages the LAN 90a. Similarly, the global IP address "IP-G2" of the GW 2 is associated with the domain name "DOMAIN2" to which the LAN 90b belongs and domain registrant information "Company B" which manages LAN 90b. Furthermore, the global IP address "IP-G3" of the GW 3 is associated with the domain name "DOMAIN1" to which the LAN 90c belongs and domain registrant information "Company A" which manages the LAN 90c. More specifically, the LAN 90a and the LAN 90c belong to the same domain "DOMAIN1." In other words, the LAN 90a and the LAN 90c should be logically considered to belong to the single local area network "DOMAIN1." At the same time, however, the LAN 90b is considered to belong to another logic local area network "DOMAIN2" which is different from the DOMAIN1.

Figure 10:
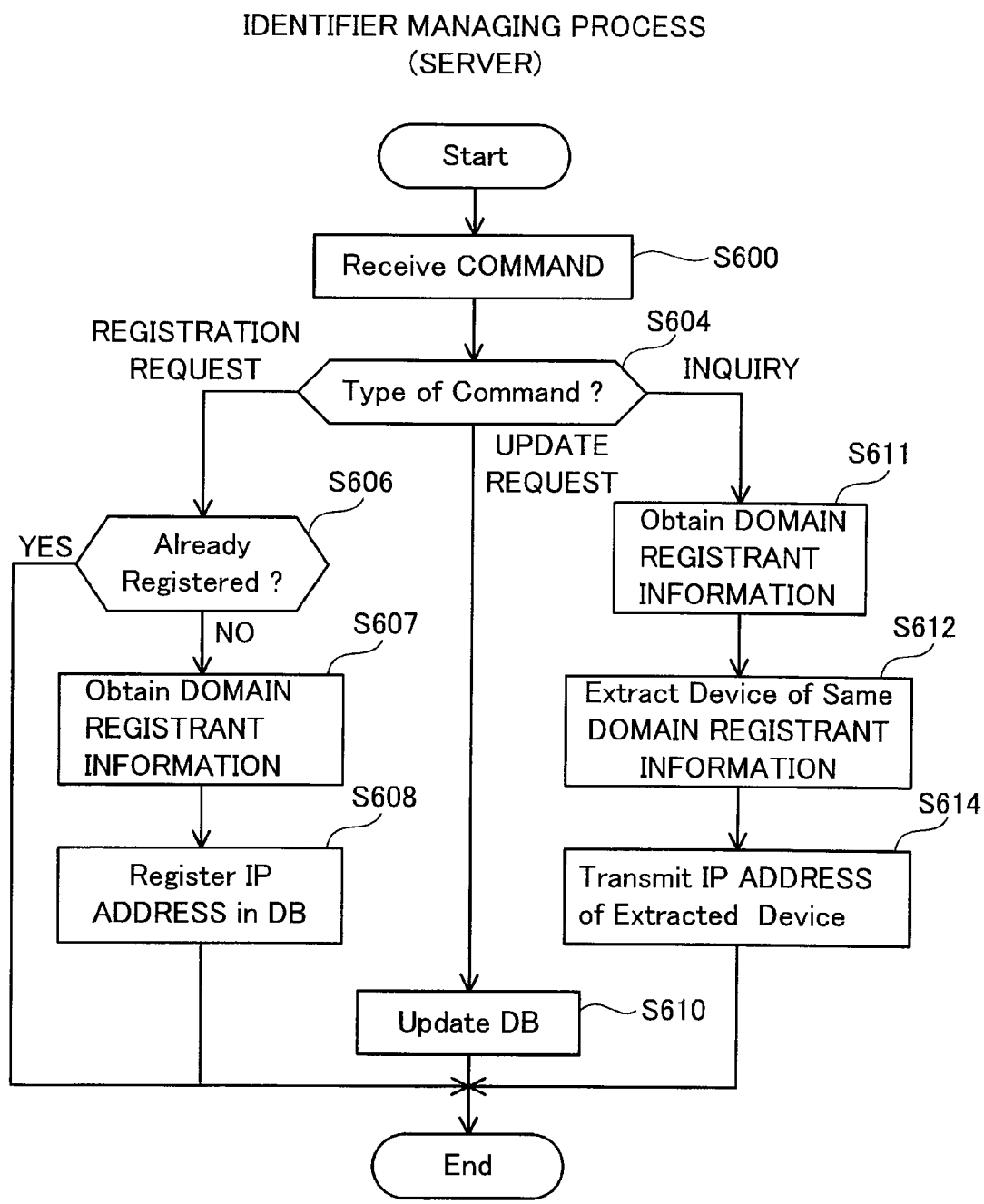
FIG. 10 is a flowchart of an identifier management process to be carried out by the server of the second embodiment.

FIG. 10 is a flowchart of an identifier managing process to be carried out by the server 10 according to the second embodiment. The steps which differ from the identifier managing process according to the first embodiment shown in FIG. 5 will be described. Since the processes at Step 600, Step 604, and Step 610 shown in FIG. 10 are practically the same as the processes at Step 400, Step 404, and Step 410, respectively, the description therefore will be omitted.

In a case where the type of the received command is a registration request and an IP address of the device designated by the received registration request, whose registration has not been done in the device DB 22 as yet (NO at Step 606), Step 607 is carried out. At Step 607, the server 10 reads out the global IP address of the GW which is appended to the packets of the aforesaid register information. The server 10 designates the read out global IP address and transmits an inquiry for the domain registrant information to the W-server 40. In reply to the inquiry, the W-server 40 sends the domain registrant information which is associated with the designated global IP address. The domain registrant information associated with the global IP address as designated is extracted from the domain DB 42. The server 10 receives the domain registrant information from the W-server 40. The process described above is carried out at Step 607. The server 10 registers the received domain registrant information in the device DB 22 as a LAN identifier that specifies the LAN to which the sender of the command (the registration request in this case) belongs (Step 608). The sender of the command may be any one of the client terminals 36 and 36b and the managing terminal 34.

An example of the device DB 22 according to the second embodiment is shown in FIG. 11. The registration request of the IP address "IP-P1" of the printer 1 is relayed by the GW 1. It should be noted that the registration request is transmitted by the client terminal 36a. As shown in FIG. 9, in the domain DB 42, the global IP address "IP-G1" of the GW 1 is associated with the domain registrant information "Company A." Therefore, as shown in FIG. 11, the IP address "IP-P1" of the printer 1 is associated with the domain registrant information "Company A." Meanwhile, the registration request of the IP address "IP-P2" of the printer 2 is relayed by the GW 3. It should be noted that the registration request is transmitted by the client terminal 36b. As shown in FIG. 9, in the domain DB 42, the global IP address "IP-G3" of the GW 3 is associated with the domain registrant information "Company A." Therefore, as shown in FIG. 11, the IP address "IP-P2" of the printer 2 is associated with the domain registrant information "Company A."

Similarly, the IP address "IP-P3" of the printer 3 is associated with the domain registrant information "Company B." It should be noted that similarly to the first embodiment, the server 10 stores the MAC address and the global IP address of the GW in a manner that the MAC address and the global IP address of the GW are associated with an IP address of each printer.

Back to FIG. 10, the process to be carried out by the server 10 when receiving the inquiry for the IP address from the managing terminal 34 will be described. At Step 611, the server 10 obtains from the W-server 40 the domain registrant information which is associated with the global IP address of the GW appended to the inquiry packets. An obtaining method is the same as the method shown in the description of Step 607. With the domain registrant information obtained from the W-server 40 as the retrieval key, the server 10 extracts from the device DB 22 the IP address of the device having the same domain registrant information (Step 612). And, the server 10 transmits the extracted IP address of the device to the managing terminal 34 (Step 614). Here, the domain registrant information is used as domain information. For example, using a domain name as a substitute for the domain registrant information, the server 10 may specify an IP address of the device which belongs to two networks which are physically discrete but should be logically considered as a single network (namely, networks of LAN 90a and 90b).

The server 10 according to the second embodiment registers grouped IP addresses of the devices which belong to the logically-single LAN (even though they are physically discrete multiple LANs). Therefore, the managing terminal 34 that manages the devices can obtain IP addresses of the devices which belong to a logically single LAN simply by transmitting an inquiry to the server 10.

The server 10 according to the second embodiment is suitable for an organization which has a relatively large-scale logical LAN (which includes a plurality of physically-discrete LANs). In such a large organization, an intranet may be separated into a plurality of LANs that are mutually connected by respective gateways. Normally, the gateways do not relay the broadcast that has been announced in one of the LANs, and therefore the managing terminal was unable to inquire of an IP address of the device connected with another LAN through the broadcast. Even this case, the managing terminal of the present embodiment can easily obtain the IP address of the device, which belongs to a physically multiple LANs but logically single LAN by employing the server 10 according to the second embodiment.

The network systems shown in the first and second embodiments include the client terminal 36 for transmitting an IP address of the device to the server 10, the server 10, and the managing terminal 34 for managing the device. Co-operation of these equipments realizes a new searching method of the device connected with the LAN. The new searching method of the device will be described.

Respective processes to be carried out by the client terminal 36, the server 10 and the managing terminal 34 are as follows:

a first transmission step which is a process of transmitting an IP address (device identifier required for communicating with the device) of the device to the server 10 to be carried out by the client terminal 36 (this process corresponds to Step 102 and Step 304);

a storing step which is a process of storing an IP address of the device and an identifier of the gateway (global IP address of the gateway) in a manner that the IP address and the identifier are associated with each other to be carried out by the server 10 (this process corresponds to Step 408);

an inquiry step which is a process of transmitting an "inquiry" to the server 10 to be carried out by the managing terminal 34 (this process corresponds to Step 500);

a read-out step which is a process of reading out, in reply to the inquiry, a device identifier (IP address of the device) of a device that belongs to the same LAN as the managing terminal, a sender of the inquiry, to be carried out by the server 10 (this process corresponds to Step 412); and a second transmission step which is a process of transmitting the read-out device identifier to the managing terminal 34, who is the sender of the inquiry, to be carried out by the server 10 (this process corresponds to Step 414).

The processes to be realized by the network system 100 or the network system 200 can be expressed as follows, with the above-described names. More specifically, there is a method for searching, by a terminal, a target device connected with the same local area network as the terminal from among multiple devices, and the method includes:

(1) a first transmitting step of transmitting a device identifier required for communicating with a device to an information-processing apparatus that is connected with a network via the device and a gateway;

(2) a storing step of storing in a storage, by an information-processing apparatus, the received device identifier in a manner that the device identifier is associated with the gateway-identifier appended to the device identifier;

(3) an inquiry step of inquiring, from the terminal, of information-processing apparatus connected with the network via the gateway about the target device;

(4) a read-out step of reading out from the storage a device identifier, which coincides with the gateway-identifier appended to the inquiry received from the terminal, to be carried out by the information-processing apparatus; and (5) a second transmitting step of transmitting the read-out device identifier to the terminal.

Some technical features of the server according to the above-described embodiments will be listed. There may be a case where the domain information is associated with the global IP address of the gateway. The domain information includes information which specifies the LAN being managed by the gateway. By utilizing the domain information, it is possible to flexibly specify the LAN with which the device is connected and the LAN with which the terminal is connected. For example, in a case where multiple gateways are connected with a single LAN, it is possible to specify the same LAN based on the domain information of each gateway whichever gateway the data passes through. An association of the global IP address with the domain information is managed by the domain-information-managing apparatus. Thus, the server preferably has an acquisition module for obtaining from the domain-information managing apparatus the device-domain information associated with each of the device-appended information and the terminal-domain information associated with the terminal-appended information. In this case, the storage stores each device-domain information associated with each device-appended information which is associated with each device identifier. And, in a case where one of the stored device-domain information coincides with the terminal-domain information which is associated with the terminal-appended information appended to the identifier-inquiry, a transmitter transmits to the terminal the device identifier associated with the device-appended information which is associated with the device-domain information coincided. The domain-information managing apparatus may be, for example, a server which is called the WHOIS server connected with the Internet.

Further, depending on company scale, global IP addresses of the gateway appended to packets may differ when each of the devices to be managed by a single terminal transmits the packets to the server via the gateway. More specifically, in a company having multiple global IP addresses of the gateway, the server may specify the device identifier to be transmitted to the terminal based on the domain information which is associated with the global IP addresses of the gateway. It should be noted that the global IP address of the gateway appended to the device identifier corresponds to the device-appended information. Such a server can transmit to the terminal the device identifier of the device to be managed by the terminal even in the same logical network having multiple gateway global IP addresses.

Functions of the server according to the embodiments may be realized as a computer program. This program includes instructions for the server to perform the following processes:

(1) a process of receiving device identifier of the device connected with any one of multiple LAN where a device-appended information is appended to the device identifier while the device identifier is transferred to the server;

(2) a process of storing the device identifier and the device-appended information in a manner that the device identifier and the device-appended information are associated with each other, wherein the server stores device identifiers and device-appended information;

(3) a process of receiving the identifier-inquiry to which the terminal-appended information is appended while the identifier-inquiry is transferred to the server from the terminal connected with any one of the networks; and (4) a process of transmitting, in a case where one of the device-appended information stored in the storage coincides with the terminal-appended information appended to the identifier-inquiry, the device identifier associated with the device-appended information coincided to the terminal.

The device is provided with a program for device which collaborates with a program for information-processing apparatus. A network identifier (IP address) of the information-processing apparatus in which the above-described program for information-processing apparatus is installed is described in the program for device. Further, the program for device includes instructions to enable the information-processing apparatus to carry out a process of transmitting a device identifier of the device. The program for device may serve also as a device driver. Further, the program for device may be included to an installation program for installing a driver in the device, not to the program mounted in the device. The installation program may be installed in a terminal capable of communicating with the device.

The program for device may include instructions to transmit the device identifier when the driver program is installed. The driver program is normally installed at the terminal which uses the device. Thus, the program for device may include instructions to transmit a device identifier when the driver program for device is installed from the terminal in which the program for device is mounted. When the driver is installed, the device comes to an operable state. Therefore, when the device becomes operable, the device may transmit the device identifier to the server.

The device may not have an appropriate communication configuration in a case, for example, where the device is newly connected with the network. The communication configuration is, for example, a configuration of the default gateway or a configuration for authentication process. On the other hand, it is highly possible that configuration of the terminal has been already completed due to an OS. Specifically, even in such a circumstance that a device identifier cannot be directly transmitted from the device to the information-processing apparatus, the device identifier can surely be transmitted, since the device identifier is transmitted from the terminal which has installed the driver program to the server Further, it is highly possible that the terminal which installs the driver program is the terminal of the device and therefore is connected with the same local area network as the device. Accordingly, the terminal-appended information can be considered to be same as that in a case where the device directly transmits the device identifier to the server.

The device identifier (IP address) of the device may be changed. Thus, the program for device may include instructions to carry out a process of transmitting the changed device identifier when the device identifier of the device is changed. Every time the device identifier is changed, a notice of the new device identifier can be given to the server. The terminal always can obtain the latest device identifier from the server.

Hereinafter, points of concern about the system and the server according to the above-described embodiment will be described. Each device transmits the MAC address and the node name in addition to the IP address as the register information or the update information, however, such configuration is rather an option. The MAC address is information inherent in the device, thereby enhancing accuracy in confirming sameness. Therefore, by specifying the device based simply on the MAC address, it is possible to prevent that the identical devices are redundantly registered as different devices by mistake when the device DB 22 is registered or updated. Similarly, it is possible to prevent the IP addresses of the different devices from being overwritten as the IP addresses of the same devices by mistake.

In a case where the IP address of the device is updated, the device transmits update information through the broadcast. However, the transmission may be carried out by means of a command other than the broadcast. For example, the client terminal 36 which installs a printer driver transmits the IP address of the client terminal 36 to the printer (device) at the time of the installation, whereby the printer stores the IP address. When the IP address is updated, the printer may transmit the update information through a unicast based on the IP address of the client terminal 36 as stored.

In the above-described embodiment, the client terminal 36 transmitted the "register command" and the "update command" to the server 10. Alternatively, the device itself may transmit the register command of the IP address to the server 10. The device itself may transmit the register information and the register command of the IP address to the server 10. At this moment, the device stores in advance communication information for communicating with the server 10. The device transmits a register command or an update command to the server 10 based on the stored communication information. The device may directly transmit the "register command" and the "update command" to the server 10, for example, at the timing of turning on the power.

If the device and the client terminal are configured to periodically transmit the MAC address in addition to the IP address as register information and the server stores the register information, the update information will not have to be transmitted. More specifically, when receiving the register information, the server 10 determines whether or not there is a record with which the MAC address coincides in the device DB. The server 10 generates a new record and registers the IP address and the MAC address which are the register information in a case where no record which coincides with the MAC address exists. On one hand, in a case where a record with which the MAC address coincides exists, the server 10 determines whether or not the IP address of the record coincides with an IP address included in the register information received. In the case where coincidence is confirmed, the server 10 terminates the process. On the other hand, in a case where the IP addresses are different from each other, the server 10 overwrites the IP address of the record by the IP address included in the register information received.

Further, the server 10, even though the register command received is a register command concerning the device already registered in the device DB 22 at the time of receiving the register command, may overwrite a record of the IP address of the device already registered.

Further, the managing terminal 34, in a case where a device which cannot communicate is found based on the device identifiers received from the server, may inform the server 10 of the device identifier concerning the device at issue. When receiving the information, the server 10 deletes the record concerning the device from the device DB 22. Thus, the server 10 does not have to transmit the device identifier concerning the device, which does not exist in the network anymore, to the managing terminal 34 from the next time. The client terminal 36 which installed a driver may transmit the notice, in a case where the client terminal 36 becomes unable to communicate with the device.

Information which may be conveyed among the server 10, the managing terminal 34 and the device (printer 1 and the like), and the client terminal 36 is encrypted and kept secret, respectively, for the purposes of improving security. Further, security can be improved by making such components authenticate when each of the components establishes communication.

The device is not limited to the printer. For example, the device may be a scanner. In this case, it will be sufficient if the client terminal transmits the register information to the server when a scanner driver for bringing the scanner into practice is installed at the client terminal.

In the second embodiment described above, whenever the register process is carried out, an inquiry of the W-server 40 about the domain registrant information associated with the global IP address of the GW is made. In addition to such a process, for example, as long as the global IP address of the GW which is same as the global IP address of the GW included in the packet, the receiver of the register command is registered in the device DB, the domain registrant information may be registered with the domain registrant information being associated with the IP address of the device received the command to register the domain registrant information which is associated with the global IP address of the GW registered in the device DB. Additionally, an inquiry to the W-server 40 of the domain registrant information associated with the global IP address of the GW may be periodically made at a predetermined timing regardless of receipt of the register command. For example, such configuration can be adapted to the case where the domain registrant information registered is changed, due to the change in the organization or the like, whereby a device identifier of the device to be managed by the managing terminal can be securely provided to the managing terminal.

In the second embodiment described above, when the register process is carried out, the domain registrant information associated with all the global IP addresses of the GWs is registered. In addition to such a process, only when the domain registrant information previously designated is obtained, the corresponding domain registrant information may be registered. In this case, under a circumstance that an inquiry about the device identifier from the managing terminal is received, if the domain registrant information is registered in the device DB 22, all the device identifiers associated with the domain registrant information will be transmitted to the managing terminal, whereas if the domain registrant information is not registered in the device DB 22, the device identifier extracted based on the global IP address of the GW will be transmitted to the managing terminal. For example, there is a case where domain registrant information is associated with the domain registrant information which is mutually set with devices to be used by multiple individuals like the domain registrant information of Internet service providers. As described, by extracting the device identifier based on the domain registrant information, it is possible to prevent extracting even the device identifiers related to the devices other than the devices subject to the management by the managing terminal.

Further, when the update command according to the second embodiment is received, the domain registrant information associated with the global IP address of the GW included in the update information received may be obtained through the W-server 40, and the domain registrant information may be updated in the device DB 22.

The specific embodiments of the present invention are described above, but these merely illustrate some possibilities of the invention and do not restrict the claims thereof. The art set forth in the claims includes transformations and modifications to the specific examples set forth above.

The technical elements disclosed in the specification or the drawings may be utilized separately or in all types of combinations, and are not limited to the combinations set forth in the claims at the time of filing the application. Furthermore, the art disclosed herein may be utilized to simultaneously realize a plurality of aims or to realize one of these aims.

What is claimed is:

1. An information-processing apparatus configured to connect with any one of mutually connected networks, comprising:
    a storage that stores device identifiers and a plurality of device-appended information, wherein each of the device-appended information is associated with a device identifier to which a device-appended information has been appended;
    a processor; and
    memory having instructions stored thereon that, when executed, cause the processor to provide
        a receiver that receives, from a client terminal connected with one of the mutually connected networks, the device identifier to which the device-appended information is appended while the device identifier is transferred to the information-processing apparatus, and receives from a terminal connected with one of the mutually connected networks an identifier-inquiry to which terminal-appended information is appended while the identifier-inquiry is transferred to the information-processing apparatus; and
        a transmitter that transmits to the terminal, in a case where one of the stored device-appended information coincides with the terminal-appended information appended to the identifier-inquiry, the device identifier that is associated with the coincided device-appended information,
    wherein the receiver receives the device identifier from the client terminal when a device driver for the device identified by the device identifier is installed into the client terminal.

2. The information-processing apparatus of claim 1, wherein each of the device-appended information and the terminal-appended information includes an IP address of a gateway that connects one network to another network that are included in the mutually connected networks.

3. The information-processing apparatus of claim 2, wherein the transmitter transmits to the terminal, in a case where the IP address included in the terminal-appended information appended to the identifier-inquiry coincides with the IP address included in the stored device-appended information, the device identifier that is associated with the coincided device-appended information.

4. The information-processing apparatus of claim 1, wherein the memory further has instructions stored thereon that, when executed, cause processor to provide
    an acquisition module for acquiring device-domain information that is associated with each of the device-appended information and terminal-domain information that is associated with the terminal-appended information from a domain-information managing apparatus, wherein
    the storage stores each of the device-domain information which is associated with each of the device-appended information associated with each of the device identifiers, and
    the transmitter transmits to the terminal, in a case where one of the stored device-domain-information coincides with the terminal-domain information associated with the terminal-appended information appended to the identifier-inquiry, the device identifier associated with the device-appended information associated with the coincided device-domain information.

5. A network system comprising:
    the information-processing apparatus of any one of claims 1 to 4, the information-processing apparatus being connected with any one of mutually connected networks;
    a device connected with one of the mutually connected networks;
    a terminal connected with one of the mutually connected networks and configured to transmit to the information-processing apparatus an identifier-inquiry;
    a client terminal configured to store a device identifier of the device when a device driver is installed for using the device into the client terminal;
    wherein the client terminal transfers the device identifier of the device to the information-processing apparatus when the device driver is installed.

6. A non-transitory computer readable medium storing computer-readable instructions that, when executed, cause a computing device to:
    receive, from a client terminal connected with one of mutually connected networks, a device identifier to which device-appended information is appended while the device identifier is transferred to the computing device;
    store the device identifier and the device-appended information in a manner that the device identifier is associated with the device-appended information, wherein the computing device is configured to store device identifiers and a plurality of device-appended information;
    receive from a terminal connected with one of the mutually connected networks an identifier-inquiry with which terminal-appended information is appended while the identifier-inquiry is transferred to the computing device;
    transmit to the terminal, in a case where one of the stored device-appended information coincides with the terminal-appended information appended to the identifier-inquiry, the device identifier associated with the coincided device-appended information,
    wherein the device identifier is received from the client terminal when a device driver for the device identified by the device identifier is installed into the client terminal.

* * * * *